United States Patent

Keller et al.

[15] 3,639,723
[45] Feb. 1, 1972

[54] WELDING CONTROL

[72] Inventors: Horst Keller, Kottingen/Wissen (Sieg); Gunter Hahn, Hausen, both of Germany

[73] Assignee: Messer Griesheim GmbH, Frankfurt am Main, Germany

[22] Filed: June 4, 1970

[21] Appl. No.: 43,503

Related U.S. Application Data

[63] Continuation-in-part of Ser. No. 720,984, Apr. 12, 1968.

[30] Foreign Application Priority Data

Apr. 15, 1967  Germany..................M 73613

[52] U.S. Cl...........................219/131 R, 323/89 A
[51] Int. Cl..............................B23k 9/06, G05f
[58] Field of Search...........323/89 C, 89 R, 89 A; 315/205; 321/25; 219/131 R, 131 F, 135

[56] References Cited

UNITED STATES PATENTS

| 3,449,543 | 6/1969 | Sciaky..................219/131 |
| 3,277,269 | 10/1966 | Zeller...................219/131 X |
| 3,148,266 | 9/1964 | Bichsel et al............219/131 F |
| 3,310,728 | 3/1967 | Jackson.................321/25 X |

FOREIGN PATENTS OR APPLICATIONS 937,477  9/1963  Great Britain...............219/131 R

*Primary Examiner*—William H. Beha, Jr.
*Attorney*—Connolly and Hutz

[57] ABSTRACT

A welding control prevents crater formation at the beginning or end of a welding operation by obtaining a constant increase and decrease in the welding current at the beginning and end of the welding operation.

8 Claims, 4 Drawing Figures

WELDING CONTROL

REFERENCE TO RELATED APPLICATION

This application is a continuation-in-part of copending application Ser. No. 720,984, filed Apr. 12, 1968.

BACKGROUND OF INVENTION

In welding machines of static construction such as welding transformers and welding rectifiers or in combination equipment of this type, it is increasingly customary to use electromagnetic structural elements whose average reactance is changed by the adjustment of a relatively low control current, whereby an advantageous static and dynamic behavior of the welding device is achieved. Particularly for the welding under a protective gas with a nonmelting tungsten electrode (WIG process), these machines enjoy great popularity, since—even at a greater distance of the welding location from the actual welding machine—they allow the welding current to change by the convection of a remote adjuster, which is connected by means of a cable with the welding current source. Furthermore, this type of machine enables a special effect for the prevention of end craters and their disadvantageous results which is known under the term "crater filling." In this regard the welding current is decreased by the lowering of the control current (maximum ca. 10 amps) to a lower value. It is possible therefore in using the corresponding welding machines to decrease the welding current by a factor of $10^{-2}$ by lowering the control current to a disappearing small value. The control currents are customarily taken either from an auxiliary winding placed on the main transformer or from a specially constructed separating transformer. The change of the direct currents required for the control then requires a variable ratio transformer or a wire potentiometer whose changing alternating current voltage is conducted to a bridge rectifier whose starting voltage then moves a current proportional to it into the control winding. Although it is advantageous that with a control power of ca. 500 watts a welding output of several 10 kw. can be adjusted, it is clear that the adjusting members at this power cannot be kept small. Adjusting members are therefore used whose windings increase in their cross section with the current intensity. It is thereby possible that an adjusting potentiometer with a power loss of 250 watts permits a control power change of ca. 500 watts.

However, these adjusting members are still quite large. In addition, the control current is conducted by means of a cable over the remote adjuster. If the cable is chosen in excess of a certain length, it must be provided by sufficiently large cross sections that the control current is not decreased too intensely by the resistor of the control cable. A further disadvantage is that the dynamic change, i.e., the speed of the increase and decrease of the control current, cannot be controlled by simple means. It is desirable to allow the welding current to fade out in a kind of exponential function. For this purpose additional energy storage batteries are necessary in the machine (e.g., idle power capacitors). A realization of such requirements fails, however, with the present state of the art because of economic reasons.

SUMMARY OF INVENTION

An object of this invention is to provide a welding control device and method for preventing the formation of craters which ordinarily occur at the beginning and end of a welding operation.

A further object of this invention is to provide a device for the adjustment of the direct current, particularly of direct currents for welding current sources, which is designed to be of space and material saving and therefore economical to produce and thus allowing without much expenditure the maintaining of the originally named requirements for a satisfactory welding, particularly for the avoidance of end craters and the like.

The invention is characterized by a thyristor arranged in the circuit and serving if necessary as a rectifier which is controllable at its control electrode by current impulses of relatively low power.

By the present invention it is now possible optimally to solve all the above-stated control problems even from an economic standpoint, whereby still newer technical solutions result which have not been mastered by the previous art. In this connection, advantageous use is made of semiconductors, which are known by the name "thyristor." These structural elements have the characteristics that they, at expertly chosen operating requirements, conduct current then and only then when the voltage placed on the main electrodes has the suitable polarity and furthermore control current—applied only impulsewise—flows on a control electrode. The amount of the conducted direct current is then determined, aside from the ballast resistor situated in the circuit, only by the phase relationship of the control impulse with reference to the supply voltage of the thyristor.

In particular, it is inventively further proposed that for the production of the current impulse there serve an impulse generator and that for the achievement of an on or off oscillation of the effective current conducted through the thyristor, there preferably be interposed a lag member to the impulse generator according to an *e*-function.

It is preferred that the lag member is a combination, known, per se, of resistor and a capacitor. Of course a combination of an Ohm resistor and a coil as the lag member is also feasible.

In order to achieve the greatest variety possible of the off-oscillation process, it is suitable to construct the Ohm resistor of the lag member to be adjustable.

The construction of the impulse generator in particular is basically arbitrary. A particularly economical and therefore advantageous impulse generator essentially consists of a unijunction transistor and an output transformer to which at least one adjustable potentiometer is cut in circuit.

A further improvement of the delay means of the arrangement for the on or off oscillation procedure can be achieved in that the lag member, in addition to the resistor and the capacitor, contain a so-called emission resistor and—switched after this—a transistor.

By the adjustable potentiometer the transistor is more or less intensely drawn up and thus acts (in line with its emission resistor) as a variable resistor, which according to the size brings with the capacitor a timelag which controls the unijunction transistor. The latter again opens the thyristor by means of output transmitter, whereby according to the control, a more or less strong current is conducted through the load.

In an alternative form, instead of an adjustable potentiometer, is provided two parallel switched adjustable potentiometers charged by a direct current source, whose supply is connectable preferably with the lag member means of a switch. By the mere switching from one adjustable potentiometer to the other, an adjustment of the control current is very quickly possible which previously can be determined by corresponding adjustment of the potentiometer.

In addition, the possibility is offered by the use of an additional relay to let the welding current slowly oscillate on or off along the lines of a program. For instance, assuming that the above-named switch for both adjustable potentiometers is situated on a relay, which by known means is brought into self-containment in short operation, that an adjustable potentiometer is placed on the lowest value, for instance, then the voltage at the capacitor will decrease according to a time constant which arises from the product of the resistor with the value of the capacitor. Similarly, the current is changed by the load resistor and the voltage decreasing at it. For example, the load resistor can be parallel switched to an adjustable resistor and arranged in line with the latter a second relay which serves by means of a contact for the activation of the primary protection of the current source. By choosing the suitable adjustment of the adjustable resistor and the second relay, it can be achieved that the voltage at the same falls below the holding voltage of the first relay. When this relay is then eliminated, the contact of the second relay can switch off the primary protection of the current source and thereby interrupt the welding.

A more advantageous and simple method can also be found to semi-automate this crater filling process. Simultaneously with the switching relay (first relay), which is operated in self-containment as above, a time relay is started which switches off the slowly deoscillating welding current after an empirically ascertained time.

These two possibilities enable the welding engineer to employ unskilled workers where previously because of the very crack-susceptible work pieces, the crater filling, i.e., the lowering of the current at the end of welding, was entrusted only to experienced welders. The current is then decreased by the automatic circuit control mechanism and automatically is switched off according to the setting directions.

The small dimensions of the potentiometer used make it possible, furthermore, to incorporate these structural elements in the handle of the welding torch. In this manner it is possible not only to switch on as well as off the welding current at the welding torch, as customary previously, as well as eventually to allow the current to jump to a value adjusted prior to the welding but also to adjust finely the welding current as desirable. Thereby the previously customary foot remote control can advantageously be eliminated.

For the elimination of the voltage peaks in the load circuit, which can result because of the generally high inductive load, it is recommended to short circuit the load circuit by a diode.

THE DRAWINGS

Figure 4:
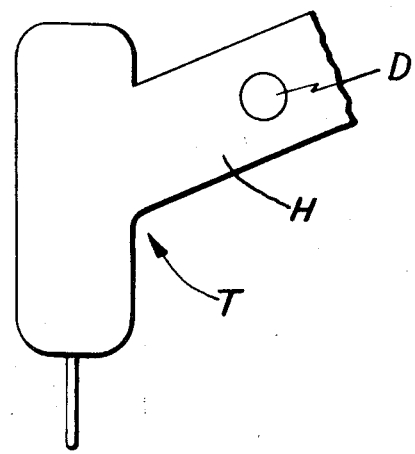

FIG. 4 schematically illustrates the arrangement of this invention in combination with a torch.

DETAILED DESCRIPTION

The purpose of the proposed device and method is the prevention or the reduction of craters in the welded seam. These craters occur during the increase of the welding current which is brought about by formation of a short circuit between the electrode and the piece being welded. The short circuits can arise by the immersion of the electrode in the molten weld because of an uneven or insufficient clearance or the formation of bridges by the melting material.

According to the proposed device and method, a prior magnetization prevents or reduces the formation of a short circuit, and thus the rise of current in the weld, upon magnitude of which crater formation depends; the rise of current in the weld should be reduced to the least possible value.

Thus the function of the invention is not to influence the formation of craters due to a short circuit during the welding process, but at the beginning and ending of the welding process to prevent the formation of craters as a result of reduced heat loss.

Stated in its simplest terms, the device and method of this invention utilize means for obtaining a constant increase or decrease in the welding current. In practice the operator turns on a switch located in the torch handle at the beginning of a welding operation to remotely initiate the control function i.e., actuate the control device). The current then rises at a constant rate from about zero until a present operative value is reached at which point the control device is automatically inactivated and the control function ceases. The control device remains inactive throughout the welding operation. At the end of the welding operation the control device is again actuated by the operator manipulating the switch and the current decreases at a constant rate from the operating value until about zero.

Figure 1:
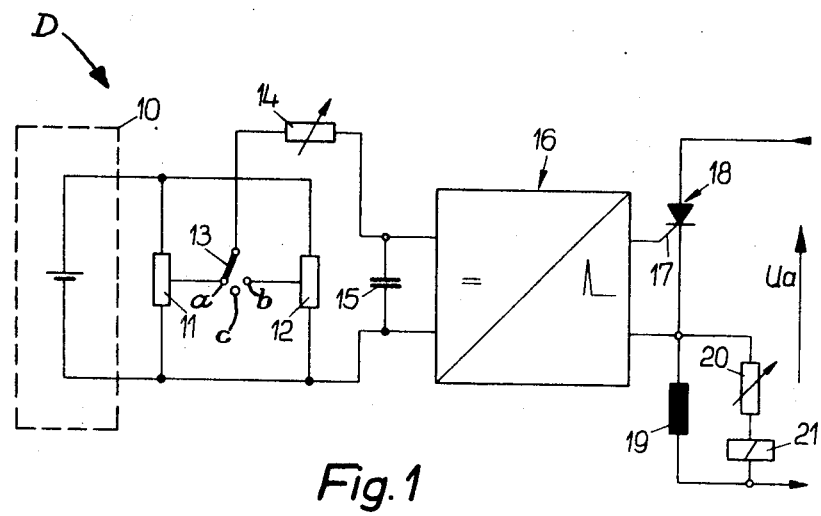
FIG. 1 is a schematic showing of a current-adjusting arrangement in accordance with this invention.
Figure 2:
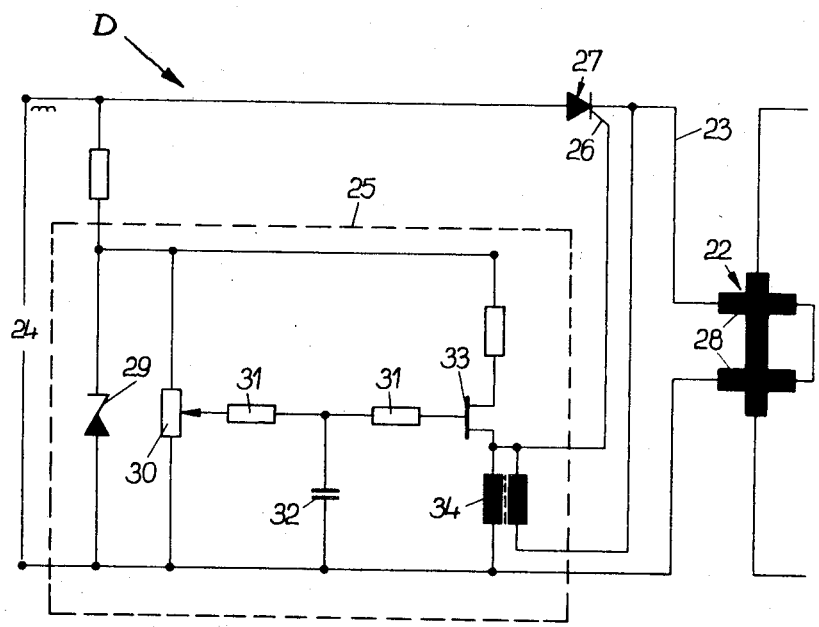
FIG. 2 is a circuit diagram of another embodiment of this invention.
Figure 3:
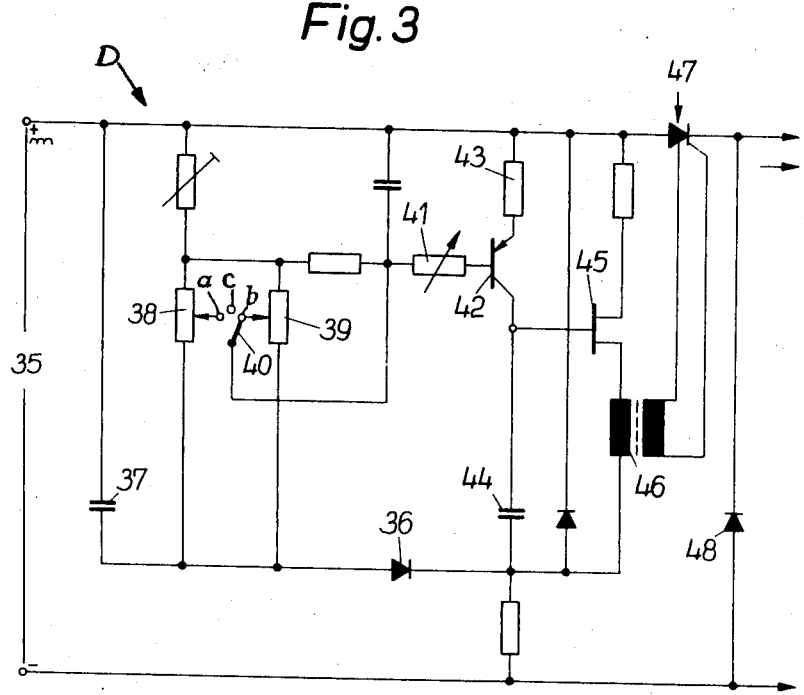
FIG. 3 is an embodiment according to FIG. 1 as a complete circuit diagram.

FIGS. 1-3 show devices in accordance with this invention, while FIG. 4 shows the switch means of these devices disposed in the handle H of torch T.

According to FIG. 1, a voltage adjustable at the grinder, of the potentiometer 11 for example, is taken from a direct current source 10 by way of potentiometer 11 or 12 and a contact 13 (having positions $a$, $b$, and $c$) as well as a delay combination consisting of a resistor 14 and a capacitor 15, and is conducted to an impulse generator. The impulse generator is illustrated schematically and designated by 16. The impulse generator 16 delivers to the control electrode 17 of a thyristor 18 current impulses whose phase relationship with respect to the driving voltage $U_a$ situated at the thyristor 18 is varied depending on the voltage set at potentiometer 11 or 12. This results in the above-described mechanisms, that in particular the current conducted through the thyristor 18 and the load symbolically illustrated as a winding and designated by 19—for example a transductor winding for the control of a welding transformer—rises or falls according to the voltage applying to the potentiometers 11, 21.

An adjusting resistor 20 as well as a relay 21 are additionally parallel switched to load 19. Relay 21 serves for the activation of the nonillustrated primary protection of the current source and thus effects at a given time an interruption of the welding process.

It is apparent that by the choice of a suitable impulse generator 16, the current expenditure over resistor 14 can be kept very low. Accordingly, the actual control means 11 or 12, in this instance the potentiometers, are in tenths of watts. It is thus possible by means of the RC combination 14, 15 which is mentioned here only as an example, to let the voltage at the capacitor 15 oscillate on or off during switching of contact 13 from potentiometer 11 to potentiometer 12 according to the time constants of the RC member 14, 15.

FIG. 2 shows a schematic diagram which allows the realization of a simple current adjustment in the control circuit of a transductor for welding current sources. The transductor is designated in FIG. 2 by 22 and its control circuit by 23. The switch at its input terminals 24 is supplied with voltage half cycles of the technical frequencies of 50 or 60 cycles per second. The impulse producer, designated in its entirety by 25 and bordered by a dotted line, then supplies current impulses to the control electrode 26 of a thyristor 27, so that this allows more or less current to be conducted into the afterswitched control winding 28 of transductor 22. The impulse producer 25 cuts with a breakdown diode 29, the plotted voltage half cycles to a trapezoid shape. By an adjusting potentiometer 30, a unijunction transistor 33 is controlled over an RC combination 31, 32, the transistor delivering according the adjustment of the adjusting potentiometer 30 a longer or shorter impulse series over an output transmitter 34 to the control electrode 26 of the thyristor 27.

A realization of the basic circuit diagram according to FIG. 1 is shown by FIG. 3. At clamps 35 the switch is again supplied with a pulsating direct current. From the pulsating supply voltage over a diode 36, a current is transmitted to the capacitor 37, which voltage can be kept practically without pulsating factor. A portion of this direct current is located at the potentiometers 38 and 39. Over switch 40 (which has positions $a$, $b$, and $c$) and a variable resistor 41, a transistor 42 is more or less intensely wound up and acts—in line with an emission resistor 43—as a variable resistor, which according to size brings about together with a capacitor 44 at a timelag which controls an unijunction transistor 45. The transistor in turn opens a thyristor 47 by way of an output transmitter 46, whereby according to the control a more or less strong current is driven through the load not shown. A diode 48 should short circuit the voltage peaks resulting by the generally high-impedance load (free-running diode).

As previously indicated the switch means of the regulating device may be advantageously disposed in the torch handle, itself, to permit the convenient operation of both the current on and off switch, as well as the fine current adjustment.

As also previously described with the inventive arrangement the current and the voltage reach, by way of a lag member, the impulse generator, which impinges upon the control electrode of a thyristor with current impulses. This thyristor is switched in the circuit of a welding voltage source. This arrangement enables the welding current, for example upon finishing the welding process, continuously to come near the zero factor. At the beginning of a welding process, however, the thyristor guides the welding current continuously up to a predetermined maximum value (value of voltage at the working point). Once one of the two values is reached (either 0 or working point), the control process is finished.

Although the specific examples relate to direct current, the invention may also be utilized with alternating current. Additionally, the thyristor need not be capable of being a rectifier. In this respect since a thyristor is a controllable diode which will allow passage of current in only one direction, if the thyristor is driven by alternating current then only the positive or only the negative half-waves will be passed through. In such an arrangement the thyristor can also, if necessary, serve as a rectifier.

What is claimed is:

1. In an electrode welding control device which utilizes a welding current applied to the welding electrode, characterized by control means for preventing crater formation and the beginning and end of a welding operation, said means causing a constant increase in the welding current until a predetermined operating current is reached at the beginning of the welding operation, said means causing a constant decrease in the welding current from said predetermined operating current at the end of a welding operation, said control means comprising a transductor, a thyristor connected to said transductor, an impulse generator connected to said thyristor for producing current impulses, a lag member connected to said impulse generator for achieving an on or off oscillation of the effective current conducted through said thyristor, and switch means connected to said lag member for the automatic switching in of the on and off oscillation of the welding current.

2. In a device as set forth in claim 1 wherein said thyristor is capable of being a rectifier, and a supplementary direct current source is connected to said switch means.

3. In a device as set forth in claim 2 wherein said impulse generator includes a unijunction transistor and an output transformer, and at least one adjustable potentiometer being connected to said transformer.

4. In a device as set forth in claim 2 including two parallel switched adjustable potentiometers energized by a direct current source having a supply, and said supply being adapted for connection to said lag member by switch means.

5. In a device as set forth in claim 2 including a relay for the automatic selective switching in of the on and off oscillation of the current.

6. In a device as set forth in claim 2 wherein said lag member includes a resistor-capacitor combination.

7. In a device as set forth in claim 6 wherein said resistor is variable.

8. In a device as set forth in claim 7 wherein said lag member further includes an emission resistor, and a transistor being connected to said emission resistor.

* * * * *